(12) United States Patent
Coakley et al.

(10) Patent No.: US 11,529,895 B2
(45) Date of Patent: Dec. 20, 2022

(54) EXTENSIBLE CHILD RESTRAINT CARRY HANDLE

(71) Applicant: Dorel Juvenile Group, Inc., Foxboro, MA (US)

(72) Inventors: Devin J. Coakley, Bellingham, MA (US); Kurt Nygren, Harvard, MA (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 17/217,180

(22) Filed: Mar. 30, 2021

(65) Prior Publication Data

US 2021/0300217 A1    Sep. 30, 2021

Related U.S. Application Data

(60) Provisional application No. 63/002,430, filed on Mar. 31, 2020.

(51) Int. Cl.
*B60N 2/28* (2006.01)
*A47D 13/02* (2006.01)

(52) U.S. Cl.
CPC .................. *B60N 2/2845* (2013.01)

(58) Field of Classification Search
CPC .... A45F 3/12; A45F 3/14; B60N 2/28; B60N 2/2845
USPC ..... 297/183.1, 183.2, 183.3, 183.4; 224/257, 224/578, 600, 607, 610–612, 614, 625, 224/626
See application file for complete search history.

(56) References Cited

U.S. PATENT DOCUMENTS

| | | | |
|---|---|---|---|
| 2,846,699 A * | 8/1958 | Watson ................. | A47D 13/02 224/616 X |
| 3,587,952 A * | 6/1971 | Higuchi ............... | A47D 13/025 224/160 |
| 4,487,346 A * | 12/1984 | Fischer, Jr. .......... | A47D 13/025 224/259 |
| 4,976,388 A | 12/1990 | Coontz | |
| 5,267,680 A * | 12/1993 | Torok .................... | A47D 13/02 297/183.1 X |
| 5,540,365 A * | 7/1996 | LaMair ................. | A47D 13/02 297/250.1 X |
| 5,573,156 A * | 11/1996 | McConnell ........... | A47D 13/02 224/608 X |
| 6,223,959 B1 * | 5/2001 | Chen ...................... | A45F 3/12 224/264 |
| 6,279,795 B1 * | 8/2001 | Pierzina ................ | A45F 3/12 224/264 |
| 6,367,875 B1 * | 4/2002 | Bapst .................... | B60N 2/2863 297/183.1 X |
| 6,375,053 B1 | 4/2002 | Cecchinel | |
| 6,378,746 B1 * | 4/2002 | Miller ................... | A47D 13/02 224/264 |
| 6,481,022 B1 * | 11/2002 | D'Addario ............ | A45F 3/12 224/643 X |
| 6,536,639 B1 * | 3/2003 | Frank ................... | A45F 3/14 224/264 |
| 7,614,531 B2 | 11/2009 | Kawakita | |

(Continued)

*Primary Examiner* — Rodney B White
(74) *Attorney, Agent, or Firm* — Barnes & Thornburg LLP

(57) ABSTRACT

A child restraint includes an infant seat and a carry handle coupled to the infant seat. The carry handle includes a shoulder pad arranged to rest on the shoulder of a caregiver wearing the carry handle in a shoulder-mounted position to support the infant seat alongside the caregiver.

20 Claims, 6 Drawing Sheets

(56) References Cited

U.S. PATENT DOCUMENTS

| | | | |
|---|---|---|---|
| D651,131 S | 12/2011 | Pontaoe | |
| 8,365,363 B2 | 2/2013 | Chen | |
| 8,464,397 B2 | 6/2013 | Arnold, IV | |
| D706,166 S | 6/2014 | Kearl | |
| 8,960,794 B2 * | 2/2015 | St. Pierre | B60N 2/32 |
| | | | 297/256.16 |
| 9,144,323 B2 | 9/2015 | Lindblom | |
| 9,192,221 B2 | 11/2015 | Just | |
| 9,232,835 B2 | 1/2016 | Kearl | |
| 9,247,787 B2 | 2/2016 | Dering | |
| 9,717,321 B2 * | 8/2017 | Eitan | A45F 3/12 |
| 9,743,778 B2 * | 8/2017 | Garritt | A47D 13/02 |
| D839,947 S | 2/2019 | Cunningham | |
| 10,233,052 B2 | 3/2019 | Joyner | |
| 2004/0144816 A1 * | 7/2004 | Ku | A45F 3/12 |
| | | | 224/264 |
| 2005/0258205 A1 * | 11/2005 | French | A45F 3/12 |
| | | | 224/264 |
| 2009/0090754 A1 | 4/2009 | Haberlein | |
| 2012/0074186 A1 | 3/2012 | Hung | |
| 2014/0296045 A1 | 10/2014 | Krstanoski-Blazeski | |
| 2018/0255910 A1 | 9/2018 | Tiblas | |
| 2019/0038044 A1 | 2/2019 | Cummings | |
| 2019/0200780 A1 | 7/2019 | Fosse | |
| 2019/0246775 A1 | 8/2019 | Merten | |
| 2020/0271413 A1 * | 8/2020 | Dilling | A45C 13/30 |

* cited by examiner

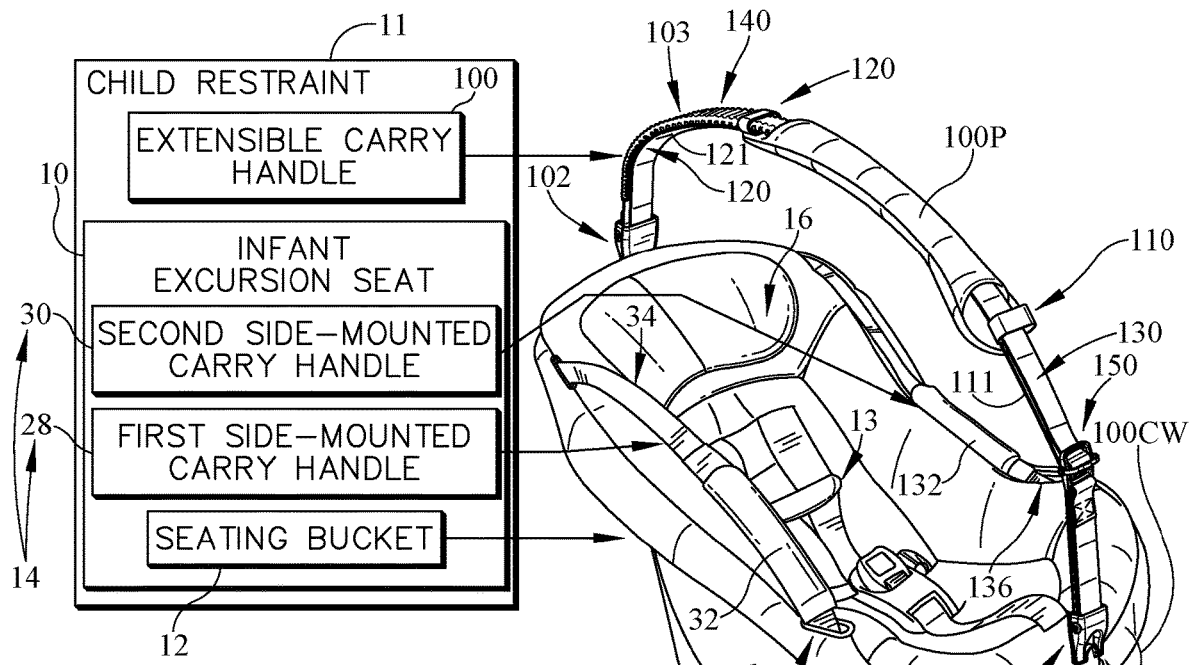
FIG. 1
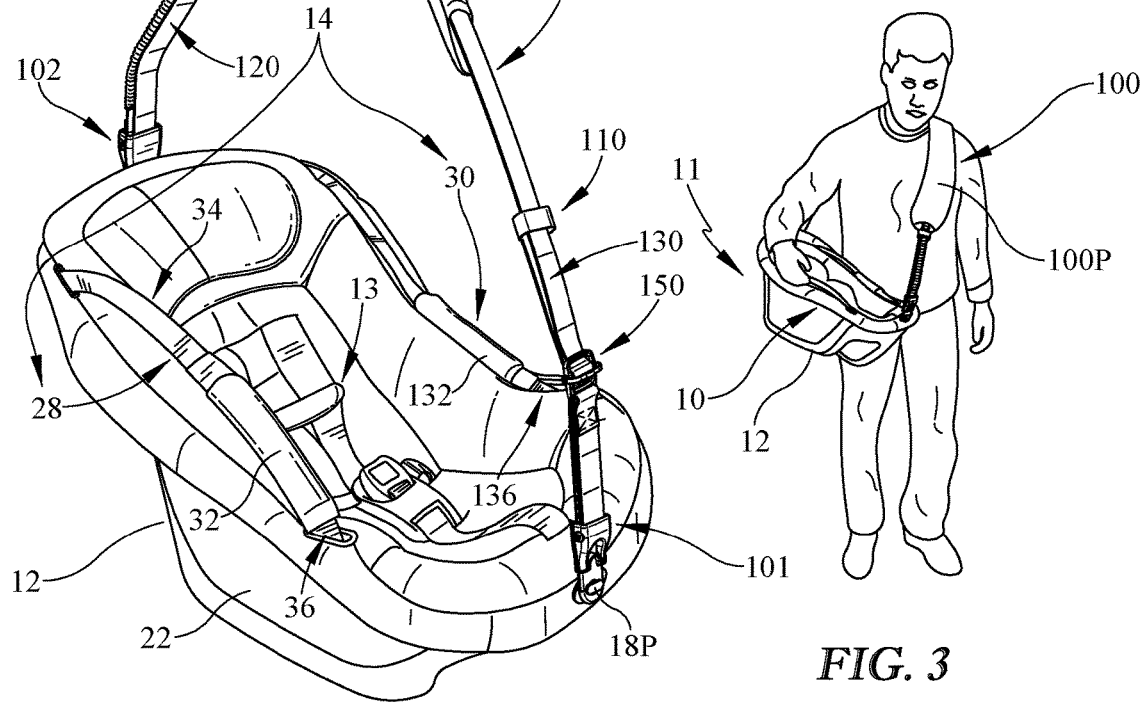
FIG. 2
FIG. 3

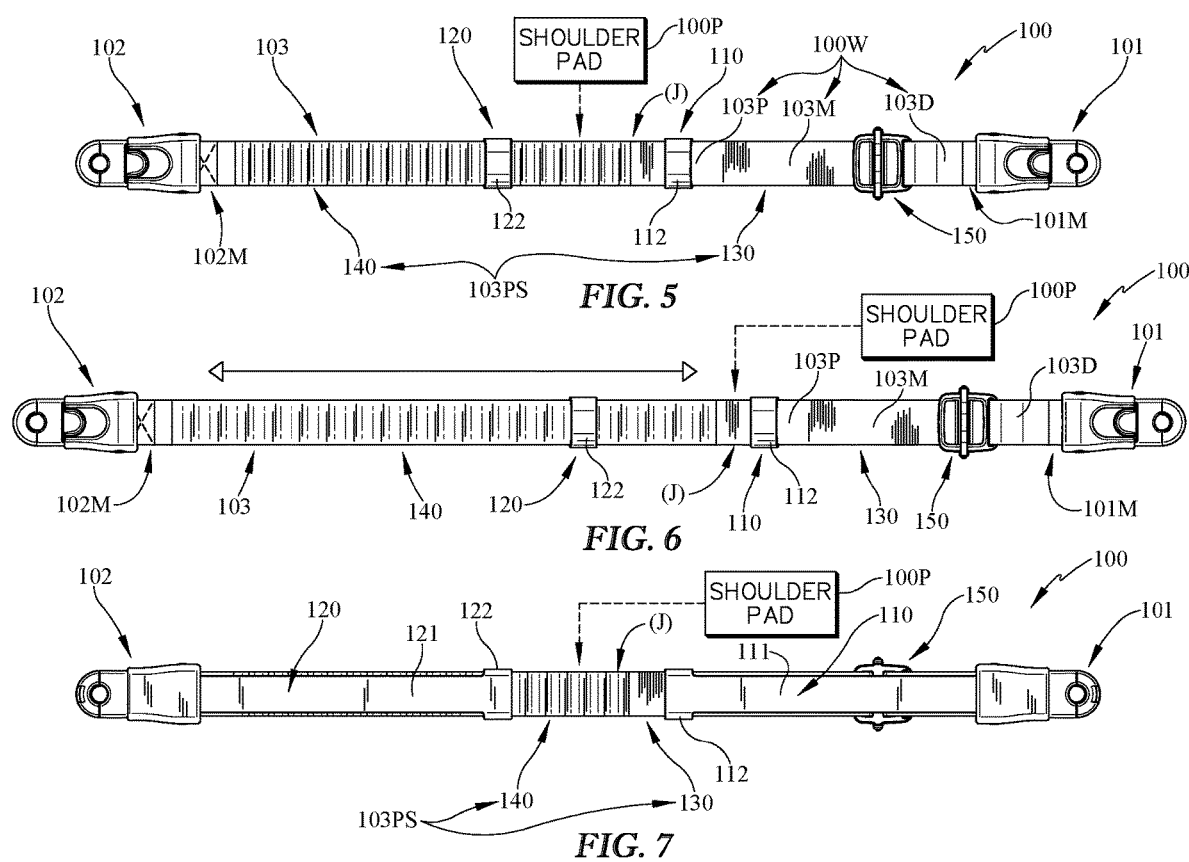

EXTENSIBLE CHILD RESTRAINT CARRY HANDLE

PRIORITY CLAIM

This application claims priority under 35 U.S.C. § 119(e) to U.S. Provisional Application No. 63/002,430 filed Mar. 31, 2020, which is expressly incorporated by reference herein.

BACKGROUND

The present disclosure relates to an extensible carry handle, and particularly to an extensible carry handle to be worn on the shoulder of a person to help that person carry an object coupled to the extensible carry handle. More particularly, the present disclosure relates to a child restraint including an extensible carry handle.

SUMMARY

A carry handle in accordance with the present disclosure includes a shoulder pad. In illustrative embodiments, a child restraint includes an infant seat an end-mounted self-supported extensible carry handle including a shoulder pad that is adapted to engage the shoulder of a caregiver during shoulder transport of the infant seat by the caregiver.

In illustrative embodiments, the extensible carry handle includes a foot-end anchor, a head-end anchor, and a variable-length anchor-connector strip arranged to interconnect the foot-end and head-end anchors. The foot-end anchor is adapted to be mated with a first anchor post coupled to a foot end of a seating bucket included in the infant seat. The head-end anchor is adapted to be mated with a second anchor post coupled to an opposite head end of the seating bucket. The anchor-connector strip can vary in length during use to allow the extensible carry handle to be stretched from a self-supported normal UNSTRETCHED mode to a temporary STRETCHED mode when the seating bucket is lifted upwardly away from an underlying surface and supported in a LIFTED position using the anchor-connector strip.

In illustrative embodiments, the variable-length anchor-connector strip includes an adjustable-length strap section and an elastic bungee section coupled to the adjustable-length strap section at a junction to form a pliable strip. The adjustable-length strap section is coupled to the foot-end anchor. The elastic bungee section is arranged to interconnect the head-end anchor and the adjustable-length strap section. A web-length adjuster is coupled to a distal end and mid-section of a web included in the adjustable-length strap section and is configured to be used by a caregiver to change the effective length of the adjustable-length strap section to change the length of the extensible carry handle.

In illustrative embodiments, the extensible carry handle is mounted on the first and second anchor posts for rotation through an angle of about 90° between a self-supported UPRIGHT USE position and one of two available self-supported ROTATED STORAGE positions. When the extensible carry handle is rotated to one of the two available ROTATED STORAGE positions, the seating bucket can be carried in accordance with the present disclosure using an alternative bucket carrier comprising first and second side-mounted carry handles that are coupled independently to the seating bucket and are separated from the end-mounted self-supported extensible carry handle.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed disclosure particularly refers to the accompanying figures in which:

FIG. 1 is a perspective view of a child restraint including a self-supported extensible carry handle in accordance with the present disclosure and showing that the child restraint includes an infant excursion seat configured to hold a seated child, an end-mounted self-supported extensible carry handle extending from a head end of the seat to a foot end of the seat and including a shoulder pad adapted to facilitate shoulder carrying of the seating bucket as suggested in FIG. 3, and side-mounted first and second carry handles adapted to facilitate hand carrying of the seating bucket as suggested in FIG. 8 after the end-mounted self-supported extensible carry handle is rotated in a first direction to lie along a first side wall of the seating bucket as shown in FIG. 9 or in an opposite second direction to lie along a second side wall of the seating bucket as shown in FIG. 11;

FIG. 2 is a view similar to FIG. 1 showing that the extensible carry handle can be stretched from a normal UNSTRETCHED mode shown in FIGS. 1, 5, and 7 to a temporary STRETCHED mode shown in FIGS. 2, 3, and 6 when the seating bucket is lifted upwardly away from an underlying surface and supported in a LIFTED position using the shoulder pad;

FIG. 3 is a perspective view showing a caregiver using the extensible carry handle to carry the seating bucket at waist level to transport an infant (not shown) located in an infant-receiving space formed in the seating bucket;

FIG. 5 is a top plan view of the extensible carry handle in the normal UNSTRETCHED mode;

FIG. 6 is a top plan view of the extensible carry handle in the temporary STRETCHED mode;

FIG. 7 is a bottom view of the extensible carry handle of FIG. 5;

DETAILED DESCRIPTION

Figure 4:
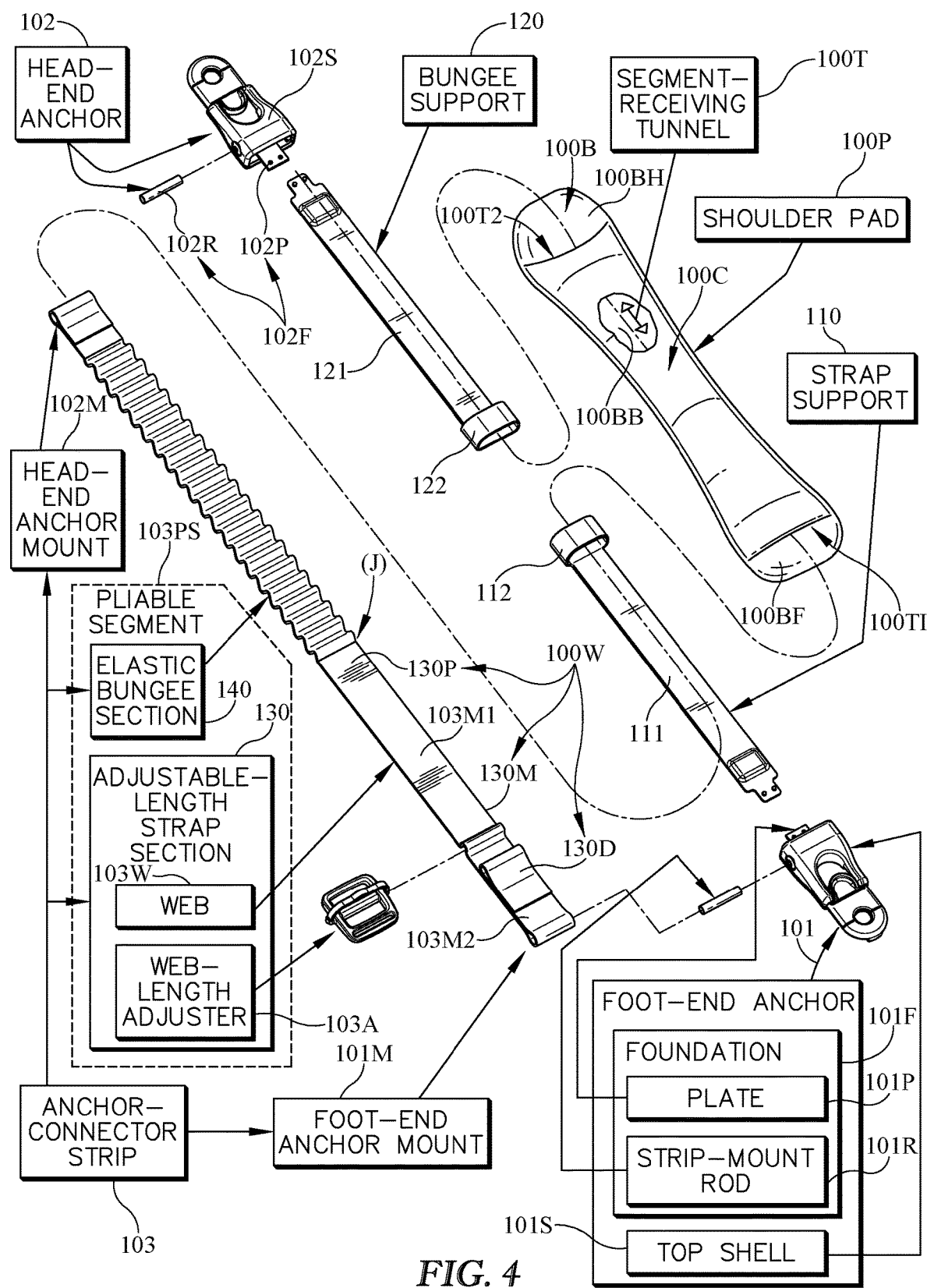
FIG. 4 is an exploded perspective assembly view of the self-supported extensible carry handle of FIGS. 1-3 showing that the extensible carry handle includes a foot-end anchor adapted to be mated with a first anchor post coupled to a foot end of the seating bucket, a semi-rigid strap support cantilevered to the foot-end anchor, a head-end anchor adapted to be mated with a second anchor post coupled to a head end of the seating bucket, a semi-rigid bungee support cantilevered to the head-end anchor and arranged to extend toward the semi-rigid strap support, a shoulder pad interposed between the semi-rigid strap and bungee supports as shown illustratively in FIG. 1, and an anchor-connector strip arranged to interconnect the foot-end and head-end anchors and extend along each of the semi-rigid strap and bungee supports and mate with the shoulder pad by extending through a tunnel formed in the shoulder pad (as shown in FIGS. 1 and 2) for sliding movement relative to the shoulder pad and also showing that the anchor-connector strip includes an adjustable-length strap section coupled to the foot-end anchor and an elastic bungee section arranged to interconnect the head-end anchor and the adjustable-length strap section and showing that a web-length adjuster is provided to be coupled to a distal end and mid-section of a web included in the adjustable-length strap section as suggested in FIGS. 1 and 8 and configured to be used by a caregiver to change the effective length of the adjustable-length strap section to change the length of the extensible carry handle.

A child restraint 11 in accordance with the present disclosure comprises an infant excursion seat 10 and an end-mounted self-supported extensible carry handle 100 coupled to opposite ends of infant excursion seat 10 as shown in FIG. 1. Infant excursion seat 10 can be carried by a caregiver using end-mounted extensible carry handle 100 as suggested in FIG. 3. Alternatively, infant excursion seat 10 can be carried by a caregiver using two side-mounted side carry handles 28, 30 as suggested in FIG. 8 while end-mounted extensible carry handle 100 has been rotated by the caregiver about longitudinally extending axes of rotation 100A1, 100A2 to one of two available (out-of-the-way) ROTATED STORAGE positions alongside and in self-supported spaced-apart position to a side wall of infant excursion seat 10 as shown, for example, in FIGS. 9 and 10 and in FIG. 11.

Infant excursion seat 10 includes a seating bucket 12 for holding an infant and first and second side carry handles 28, 30 that are coupled to seating bucket 12 and are gripped by a caregiver to transport infant excursion seat 10 after separation from a companion stroller frame or excursion-seat carrier or from a vehicle passenger seat (none of which are shown). Infant excursion seat 10 includes a hand grip 32 or 132 in each of the first and second side carry handles 28, 30 and an extensible grip tether 36 or 136 that yieldably and automatically moves its companion hand grip 32 or 132 of each side carry handle 28, 30 normally to a LOWERED STORAGE position alongside the seating bucket 12 and frees the companion hand grips 32 or 132 to be moved by a caregiver upwardly away from the seating bucket 12 from the LOWERED STORAGE position to a RAISED BUCKET-CARRYING position so that the caregiver can grip both hand grips 32, 132 in one hand and carry the infant in the seating bucket 12 using side carry handles 28, 30 as suggested in FIG. 8.

Figure 9:
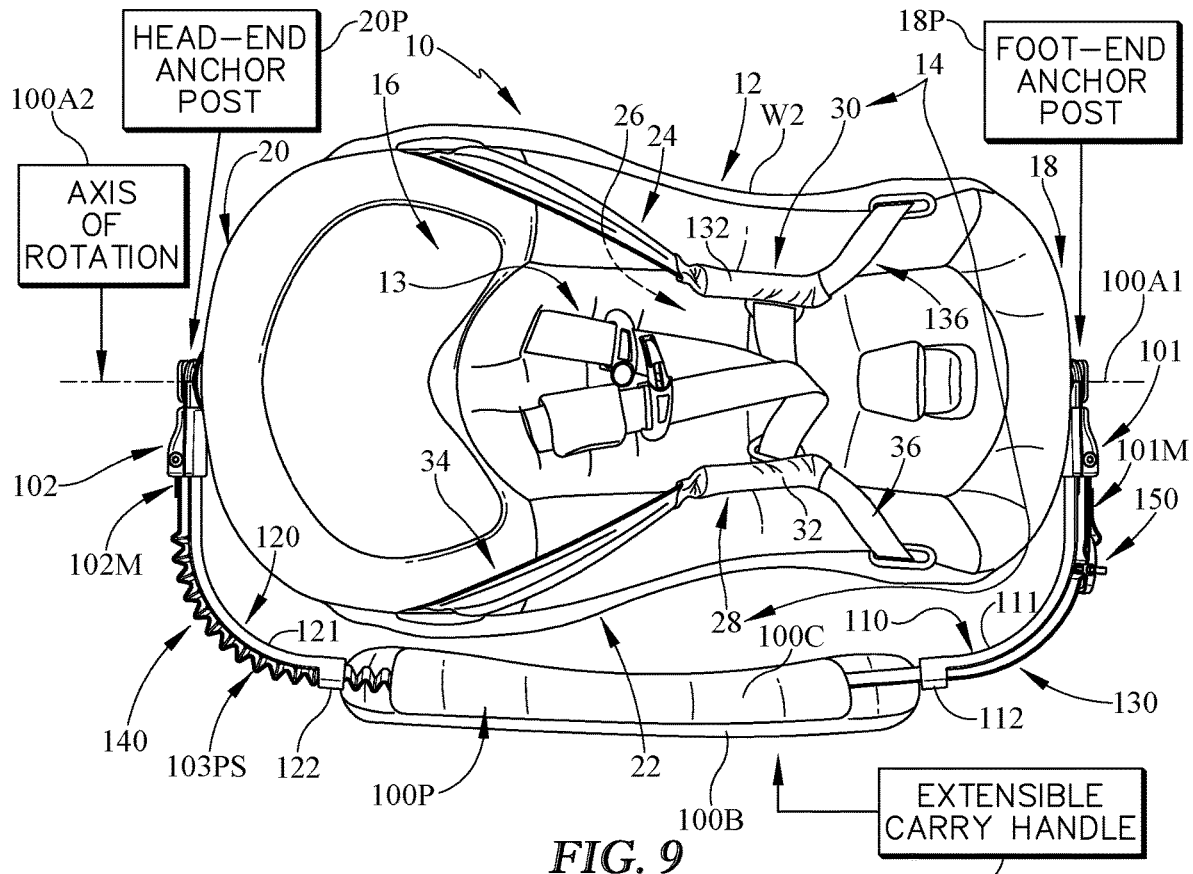
FIG. 9 is a top plan view of the infant excursion seat of FIG. 8 after the extensible carry handle has been mounted on the first and second anchor posts for rotation about a longitudinally extending axis of rotation and rotated 90° from an UPRIGHT USE position shown in FIG. 1 to one of two available ROTATED STORAGE positions shown in FIGS. 9 and 10 to lie in a self-supported spaced-apart relation to a first side wall of the seating bucket to allow a caregiver to carry the seating bucket using the first and second side carry handles provided on the first and second side walls of the seating bucket in a manner shown, for example, in FIG. 8.

Child restraint 11 comprises an infant excursion seat 10 including a seating bucket 12, a child-restraint harness 13, and a bucket carrier 14 as shown in FIGS. 1 and 2. Seating bucket 12 is formed to include an interior child-carrying space 16 as suggested in FIGS. 1 and 9. Seating bucket 12 includes a foot end 18, an opposite head end 20, a first side wall 22 extending between foot and head ends 18, 20, and a second side wall 24 extending between foot and head ends 18, 20 and lying in spaced-apart relation to first side wall 22 to locate the interior child-carrying space 16 therebetween as shown in FIG. 9. Seating bucket 12 also includes a floor 26 coupled to each of side walls 22, 24 and ends 18, 20. Bucket carrier 14 includes a first side carry handle 28 associated with first side wall 22 of seating bucket 12 and a second side carry handle 30 associated with second side wall 24 of seating bucket 12.

Figure 8:
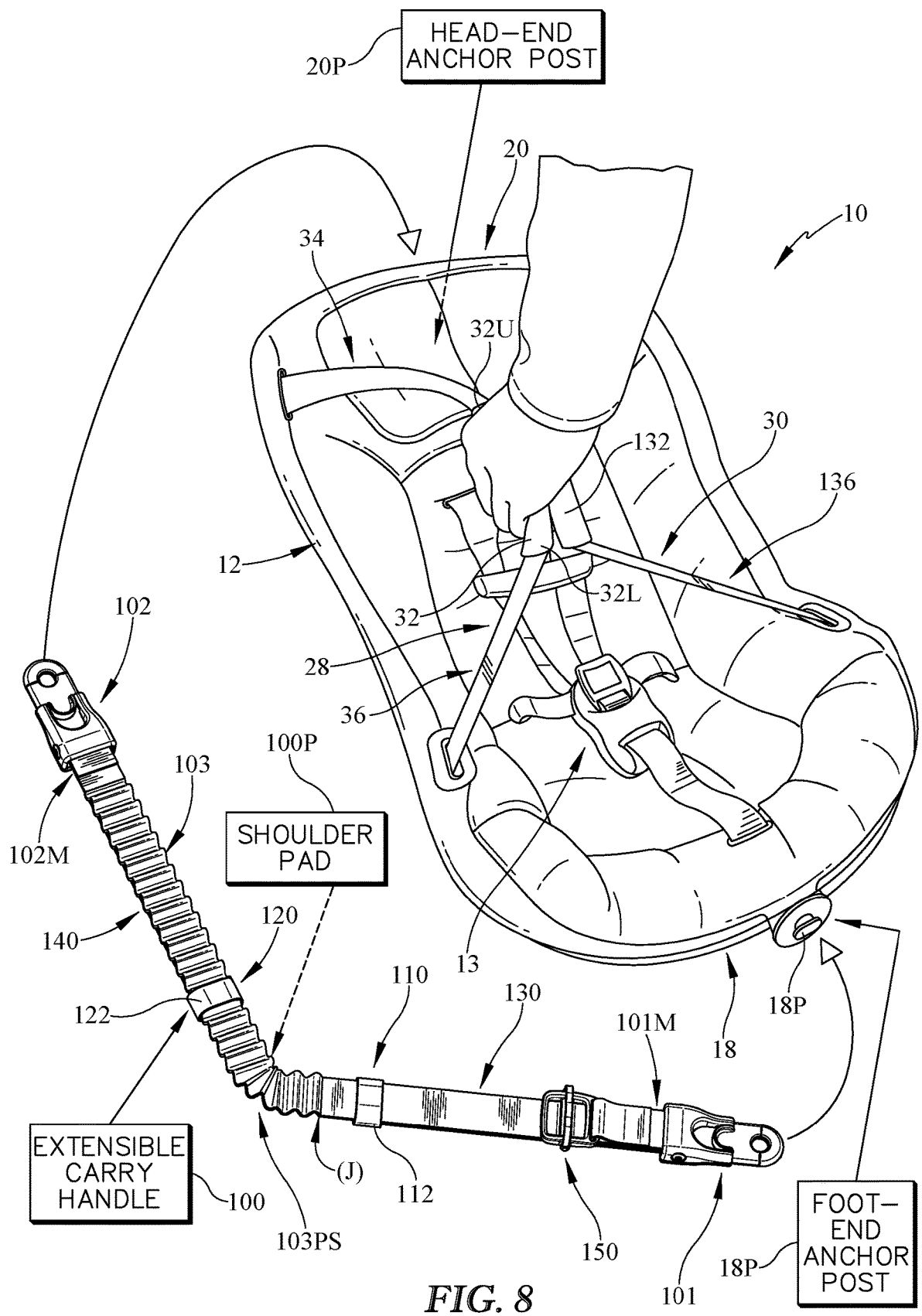
FIG. 8. is a perspective view showing that the infant excursion seat of FIG. 1 can be carried using the side-mounted first and second side carry handles after they have been pulled upwardly by a caregiver from a LOWERED STORAGE position shown in FIGS. 1 and 2 to a RAISED BUCKET-CARRYING position shown in FIG. 8 and showing the extensible carry handle of FIGS. 1, 5, and 7, in its UNSTRETCHED mode before it is attached to the anchor posts that are located at opposite ends of the seating bucket.

First side carry handle 28 includes a first hand grip 32, a head-end grip tether 34, and a foot-end grip tether 36 as shown in FIGS. 1 and 2. First hand grip 32 is arranged to be gripped and moved relative to seating bucket 12 by a person carrying seating bucket 12 from a LOWERED STORAGE position shown in FIG. 1 located in close proximity to foot end 18 of seating bucket 12 to a RAISED BUCKET-CARRYING position that is shown in FIG. 8 and located above a mid-section of first side wall 22 and between foot and head ends 18, 20 of seating bucket 12. First hand grip 32 includes an upper end 32U facing toward the head end 20 of seating bucket 12 and a lower end 32L facing toward foot end 18 of seating bucket 12. Head-end grip tether 34 is arranged to interconnect upper end 32U of first hand grip 32 and head end 20 of seating bucket 12. Foot-end grip tether 36 is arranged to interconnect lower end 32L of first hand grip 32 and foot end 18 of seating bucket 12.

Child restraint 11 includes an infant excursion seat 10 configured to hold a seated child (not shown) and an end-mounted self-supported extensible carry handle 100 extending from a head end 20 of seat 10 to a foot end 18 of seat 10 and including a shoulder pad 100P adapted to facilitate shoulder carrying of seating bucket 12 as suggested in FIG. 3. Child restraint 11 also includes side-mounted first and second side carry handles 28, 30 adapted to facilitate hand carrying of seating bucket 12 as suggested in FIG. 8.

Extensible carry handle 100 can be stretched by a caregiver from a normal self-supported UNSTRETCHED mode shown in FIGS. 1, 5, and 7 to a temporary STRETCHED mode shown in FIGS. 2, 3, and 6 when seating bucket 12 is lifted upwardly away from an underlying surface (F) and supported in a LIFTED position using shoulder pad 100P. A caregiver is shown in FIG. 3 using extensible carry handle 100 to carry seating bucket 12 at waist level to transport an infant (not shown) located in an infant-receiving space 16 formed in seating bucket 12.

An exploded perspective assembly view of extensible carry handle 100 is provided in FIG. 4 to show that extensible carry handle 100 includes a foot-end anchor 101 adapted to be mated with a first anchor post 18P coupled to foot end 18 of seating bucket 12, a semi-rigid strap support 110 cantilevered to foot-end anchor 101, a head-end anchor 102 adapted to be mated with a second anchor post 20P coupled to head end 20 of seating bucket 12, a semi-rigid bungee support 120 cantilevered to head-end anchor 102 and arranged to extend toward the semi-rigid strap support 110, a shoulder pad 100P (shown diagrammatically) interposed between the semi-rigid strap and bungee supports 110, 120

(as shown illustratively in FIG. 1), and an anchor-connector strip 103 arranged to interconnect foot-end and head-end anchors 101, 102 and extend along each of the semi-rigid strap and bungee supports 110, 120 and mate with shoulder pad 100P for sliding movement relative to shoulder pad 100P. Anchor-connector strip 103 includes an adjustable-length strap section 130 coupled to foot-end anchor 101 and an elastic bungee section 140 arranged to interconnect head-end anchor 102 and the adjustable-length strap section 130 as suggested in FIGS. 4 and 5. A web-length adjuster 103A is provided to be coupled to a distal end 130D and mid-section 130M of a web 103W of the adjustable-length strap section 130 as suggested in FIGS. 1 and 8 and configured to be used by a caregiver to change the effective length of adjustable-length strap section 130 to change the length of extensible carry handle 100.

Infant excursion seat 10 can be carried using the side-mounted first and second side carry handles 28, 30 after they have been pulled upwardly by a caregiver from a LOWERED STORAGE position shown in FIGS. 1 and 2 to a RAISED BUCKET-CARRYING position shown in FIG. 8. The extensible carry handle 100 is shown in its normal UNSTRETCHED mode in FIG. 8 before it is attached to the anchor posts 101, 102 that are located at opposite ends 18, 20 of seating bucket 12 as suggested in FIG. 9.

Figure 10:
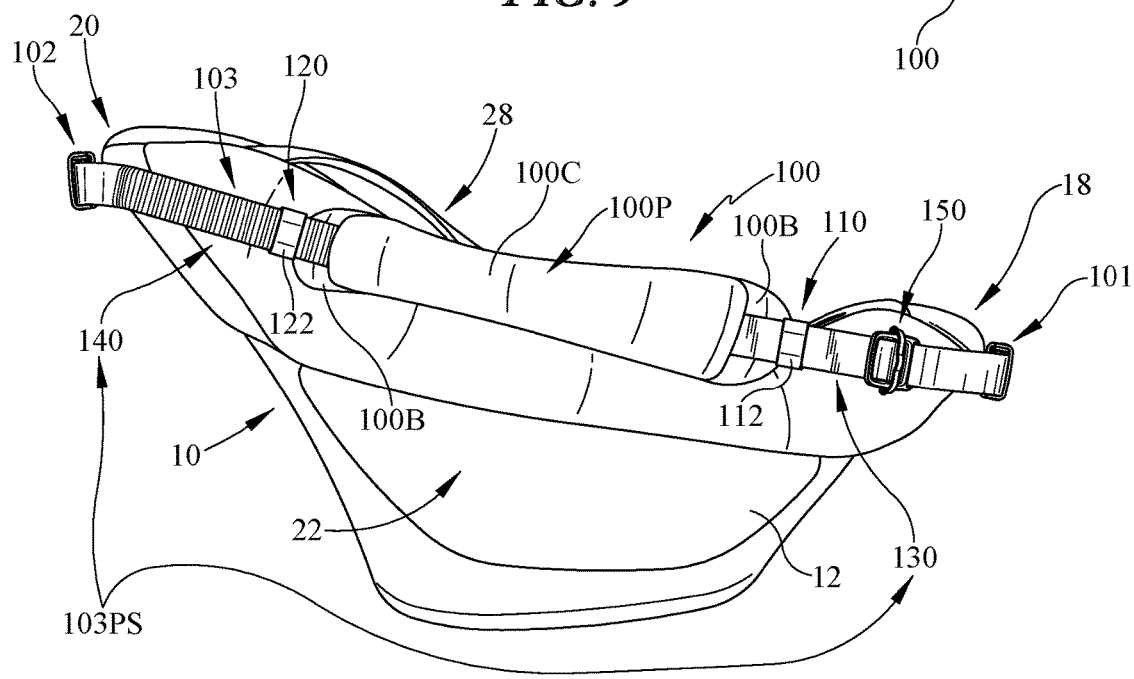
FIG. 10 is a left-side elevation view of the child restraint of FIG. 9.

Infant excursion seat 10 is shown in FIG. 9 after the extensible carry handle 100 has been mounted on the first and second anchor posts 101, 102 and for rotation about longitudinally extending axes of rotation 100A1, 100A2 through an angle of 90° from a self-supported UPRIGHT USE POSITION shown in FIG. 1 to a self-supported FIRST ROTATED STORAGE position shown in FIGS. 9 and 10. Alternatively, extensible carry handle 100 can be rotated in an opposite direction to arrive at a self-supported SECOND ROTATED STORAGE position as shown in FIG. 11.

The extensible carry handle 100 is attachable to an infant seat 10 to help users carry their child. The extensible carry handle 100 comprises a long strip 103 configured to go across a caregiver's shoulder as shown in FIG. 3 to allow for hands-free carrying of infant seat 10 in a comfortable ergonomic position. This transfers the weight of the infant seat 10 and the child in seat 10 into the stronger portions of the caregiver's body allowing the caregiver to carry infant seat 10 comfortably over long periods of time without blocking the ability of the caregiver to rotate the end-mounted extensible carry handle 100 about axes of rotation 100A1, 100A2 to free seat to be carried using the side-mounted side carry handles 28, 30 included in bucket carrier 14 as shown in FIG. 8.

A child restraint 11 includes an infant excursion seat 10 and an end-mounted self-supported extensible carry handle 100 as shown in FIGS. 1-3. Extensible carry handle 100 though flexible is able to self-support to assume an upwardly bowed U-shape as illustrated in FIG. 1 when extensible carry handle 100 assumes a normal UNSTRETCHED mode overlying an interior child-carrying space 16 formed in seating bucket 12, in part, owing to inclusion of a semi-rigid bendable strap-support beam 111 in a strap support 110 of extensible carry handle 100 and of a semi-rigid bendable bungee-support beam 121 in a bungee support 120 of extensible carry handle 100 as suggested in FIGS. 1 and 4. Extensible carry handle 100 can also be stretched from the normal UNSTRETCHED mode shown in FIG. 1 to a temporary STRETCHED mode shown in FIG. 2.

Figure 11:
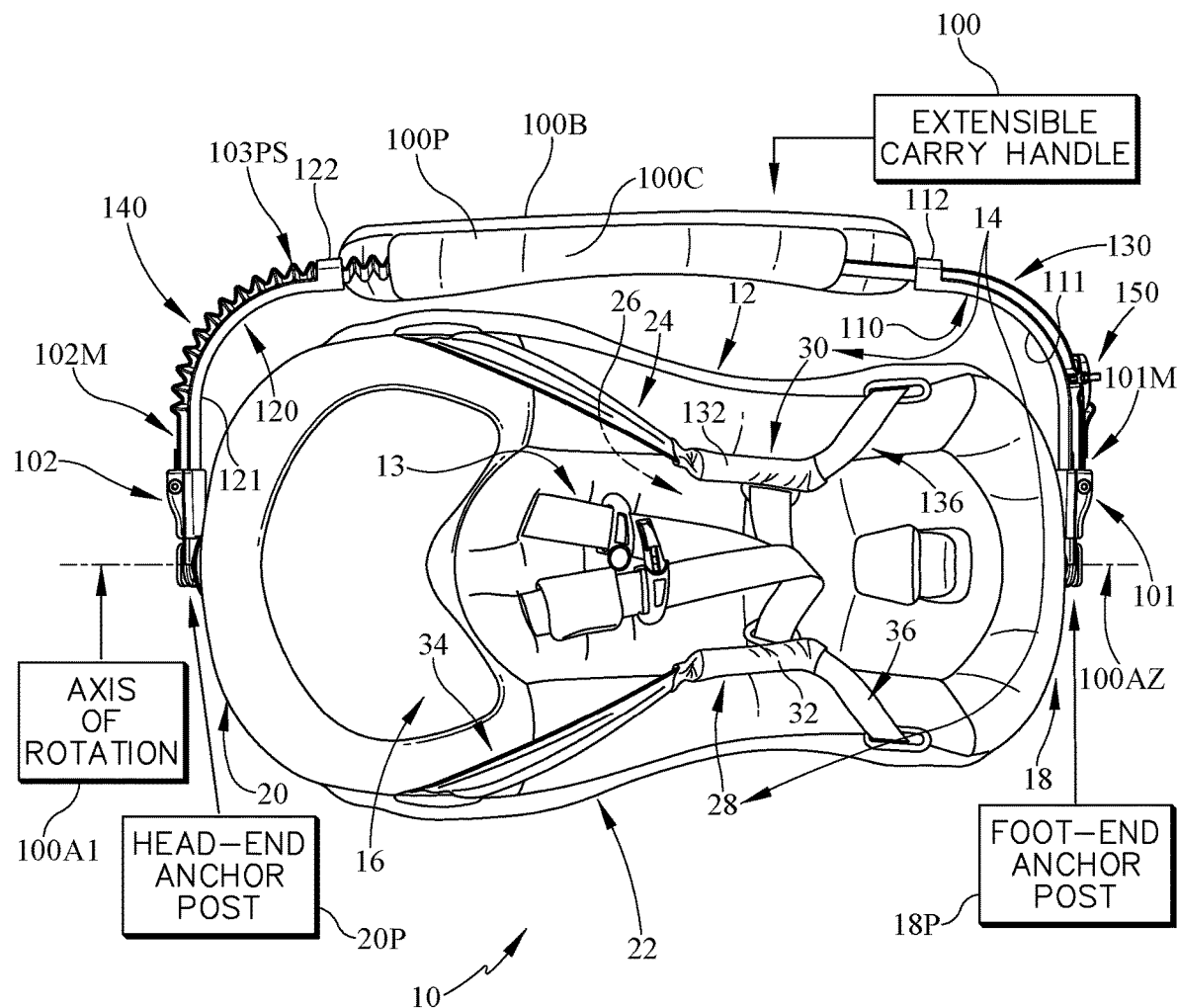
FIG. 11 is a top plan view similar to FIG. 9 but showing the end-mounted self-supported extensible carry handle after it has been rotated from UPRIGHT USE position in a clockwise direction to arrive a SECOND ROTATED STORAGE position located in self-supported spaced-apart relation to a second side wall of the seating bucket to allow a caregiver to carry the seating bucket using the first and second side carry handles provided on the first and second side walls of the seating bucket in a manner shown, for example, in FIG. 8.

Infant excursion seat 10 includes a seating bucket 12, a first anchor post 18P, and a second anchor post 10P as shown in FIGS. 1, 9, and 11. Seating bucket 12 is formed to include an interior child-carrying space 16 for holding a child (not shown) to be carried in infant excursion seat 10. First anchor post 18P is coupled to a foot end 18 of seating bucket 12 and arranged to extend away from the interior child-carrying space 16. Second anchor post 20P is coupled to an opposite head end 20 of seating bucket 12 and arranged to extend away from first anchor post 18P and interior child-carrying space 16.

Extensible carry handle 100 can be rotated by a caregiver about first and second anchor posts 18P, 20P in a counterclockwise direction 100CCW relative to seating bucket 12 through an angle of about 90° to arrive at a self-supported FIRST ROTATED STORAGE position shown in FIGS. 9 and 10. Once extensible carry handle 100 arrives in the FIRST ROTATED STORAGE position it is self-supported, in part, by the semi-rigid bendable strap-support and bungee-support beams 111, 121 to lie in a suspended position alongside a first side wall 22 of seating bucket 12 to lie in spaced-apart relation to first side wall 22 of seating bucket 12 as shown in FIG. 9.

Extensible carry handle 100 alternatively can be rotated by a caregiver about first and second anchor posts 10P, 20P in a counterclockwise direction 100CCW relative to seating bucket 12 through an angle of about 90° to arrive at a self-supported SECOND ROTATED STORAGE position shown in FIG. 11. Extensible carry handle 100 is self-supported, in part, by the semi-rigid bendable strap-support and bungee-support beams 111, 121 to lie in a suspended position alongside an opposite second side wall 24 of seating bucket 12 to lie in spaced-apart relation to second side wall 24 of seating bucket 12 as shown in FIG. 11.

Extensible carry handle 100 includes a foot-end anchor 101, a strap support 110, a bungee support 120, a head-end anchor 102, and a variable length anchor-connector strip 103 as shown in FIGS. 1, 4, and 5. A caregiver can change the length of variable-length anchor-connector strip 103 in accordance with the present disclosure to adjust the position of seating bucket 12 on the caregiver's body. One selected body positon of seating bucket 12 is shown in FIG. 3.

Foot-end anchor 101 is adapted to be mated with first anchor post 18P on seating bucket 12 as shown in FIG. 9. Strap support 110 is formed to include a semi-rigid bendable strap-support beam 111 that is cantilevered to foot-end anchor 101 to extend toward head-end anchor 102 and a first strip receiver 112 that is coupled to a free end of the semi-rigid bendable strap-support beam 111 as suggested in FIG. 1.

Head-end anchor 102 is adapted to be mated with second anchor post 20P on seating bucket 12 as shown in FIG. 9. Bungee support 120 is formed to make a semi-rigid bendable bungee-support beam 121 cantilevered to head-end anchor 102 to extend toward strap support 110 and a second strip receiver 122 coupled to a free end of the semi-rigid bendable bungee-support beam 122 as suggested in FIGS. 1 and 4.

Variable-length anchor-connector strip 103 includes a head-end anchor mount 102M coupled to head-end anchor 102, a foot-end anchor mount 101M coupled to foot-end anchor 101, and a pliable segment 103PS as shown, for example, in FIG. 4. Pliable segment 103PS is arranged to interconnect head-end and foot-end anchor mounts 102M, 101M and lie above the semi-rigid bendable strap-support and bungee-support beams 111, 121 and pass through the first and second strip receivers 112, 127 to allow movement of variable-length anchor-connector strip 103 relative to each of strap and bungee supports 110, 120 to facilitate a change in length of anchor-connector strip 103 and therefor pliable segment 103PS as suggested in FIGS. 1, 2, and 9. Semi-rigid bendable strap-support and bungee-support beams 111, 121, first and second strip receivers 112, 122, anchor-connector strip 103, and shoulder pad 100P cooperate in accordance with the present disclosure to transfer the load from extensible carry handle 100 into a broad section of the caregiver's shoulder.

Pliable segment 103PS of variable-length anchor-connector strip 103 includes an adjustable-length strap section 130 and an elastic bungee section 140 as shown in FIG. 4. Adjustable-length strap section 130 is arranged to interconnect elastic bungee section 140 and foot-end anchor mount 101M and to overlie and engage an upwardly facing surface of the semi-rigid bendable strap-support beam 111 as suggested in FIG. 1. Elastic bungee section 140 is coupled to head-end anchor mount 102M and arranged to overlie and engage an upwardly facing surface of the semi-rigid bendable bungee-support beam 121 as suggested in FIG. 1.

A shoulder pad 100P is also included in child restraint 11 as suggested in FIGS. 1 and 4. Should pad 100P is adapted to engage a shoulder of a caregiver during shoulder transport of infant excursion seat 10 by the caregiver as shown in FIG. 3. Shoulder pad 100P is coupled to pliable segment 103PS of variable-length anchor-connector strip 103 and arranged to lie in a position on pliable segment 103PS between first strip receiver 112 of strap support 110 and second strip receiver 122 of bungee support 120 as suggested in FIGS. 1 and 4.

Shoulder pad 100P includes an elongated base 100B and a cover 100C as shown in FIG. 4. Elongated base 100B is arranged to underlie pliable segment 103PS of variable-length anchor-connector strip 103. Cover 100C is mounted on elongated base 100B to form a segment-receiving tunnel 100T as suggested in FIG. 4. Cover 100C is arranged to lie between first and second strip receivers 112, 122 as shown in FIG. 1. Pliable segment 103PS is arranged to extend though the segment-receiving tunnel 100T formed in shoulder pad 100P between base 100B and cover 100C to support shoulder pad 100P on variable-length anchor-connector strip 103 as shown in FIG. 1.

Shoulder pad 100P is formed to include a head-end inlet 100T2 and a foot-end inlet 100T1 as shown in FIGS. 4 and 10. Head-end inlet 100T2 opens into the segment-receiving tunnel 100T and faces toward second strip receiver 122. Foot-end inlet 100T1 opens into the segment-receiving tunnel 100T and faces toward first strip receiver 112. Elastic bungee section 140 of pliable segment 103RS extends into the segment-receiving tunnel 100T formed in shoulder pad 100P through the head-end inlet 100T2. Adjustable-length strap section 130 of pliable segment 103PS extends into the segment-receiving tunnel 100T to mate with elastic bungee section 140 at a junction (J) inside the segment-receiving tunnel 100T. Each of the semi-rigid bendable bungee-support and strap-support beams 111, 121 lies outside of segment-receiving tunnel 100T formed in the shoulder pad 100P.

Elongated base 100B of shoulder pad 100P includes head end 100BH, a foot end 100BF, and a body 100BB as shown in FIG. 4. Head end 100BH is arranged to underlie free end of the semi-rigid bendable bungee-support beam 121. Head end 100BH is separated from second strip receiver 122 to locate free end of the semi-rigid bendable bungee-support beam 121 between head end 100BH and second strip receiver 122. Foot end 100BF is arranged to underlie free end of the semi-rigid bendable strap-support beam 111. Foot end 100BF is separated from first strip receiver 112 to locate free end of the semi-rigid bendable strap-support beam 111 between foot end 100BF and first strip receiver 112. Body 100BB is arranged to interconnect head and foot ends 100BH, 100BF and support junction (J) of elastic bungee section 140 and adjustable-length strap section 130 of pliable segment 103PS of variable-length anchor-connector strip 103 when junction (J) is located in segment-receiving tunnel 100T.

Elastic bungee section 140 is configured normally to assume a CONTRACTED shape having a first length as shown in FIG. 1 to establish a normal self-supported UNSTRETCHED mode of extensible carry handle 100 when seating bucket 12 of infant excursion seat 10 is at rest on an underlying floor (F) or other surface and when foot-end anchor 101 of extensible carry handle 100 is mated with first anchor post 101 of infant excursion seat 10 and head-end anchor 102 of extensible carry handle 100 is mated with second anchor post 20P of infant excursion seat 10. Elastic bungee section 140 is configured to deform elastically to assume an EXPANDED shape having a relatively longer second length as shown in FIG. 2 so as to establish a temporary STRETCHED mode of extensible carry handle 100 when seating bucket 12 of infant excursion seat 10 is lifted upwardly away from the underlying floor (F) and supported in a LIFTED position using variable-length anchor-connector strip 103 of extensible carry handle 100.

Elastic bungee section 140 includes a topside that is oriented to face away from the semi-rigid bendable bungee-support beam 121 and interior child-carrying space 16 and an underside that is oriented to face toward the semi-rigid bendable bungee-support beam 121 as shown in FIGS. 1 and 2. The semi-rigid bendable bungee-support beam 121 is configured to bend to assume an outwardly bowed curved shape when extensible carry handle 100 assumes the temporary STRETCHED mode to provide bungee-deformation means for temporarily deforming elastic bungee section 140 to impart a convex shape to the topside of elastic bungee section 140 and a concave shape to the underside of elastic bungee section 140 while extensible carry handle 100 remains in the temporary STRETCHED mode as suggested in FIG. 2. The semi-rigid bendable strap-support beam 111 is configured to bend to assume an outwardly bowed curved shape when extensible carry handle 100 assumes the temporary STRETCHED mode to provide strap-deformation means for temporarily deforming the adjustable-length strap section 130 to impart a concave shape to an underside of the adjustable-length strap section 130 oriented to face toward interior child-carrying space 16 formed in seating bucket 12 of infant excursion seat 10 while extensible carry handle 100 remains in the temporary STRETCHED mode.

Shoulder pad 100P is mounted on pliable segment 103PS of variable-length anchor-connector strip 103 to cover a junction (J) provided at an interface between elastic bungee section 140 and adjustable-length strap section 130 as suggested in FIG. 1. Second strip receiver 122 coupled to free end of the semi-rigid bendable bungee-support beam 121 and shoulder pad 100P are separated by a first distance when extensible carry handle 100 assumes the normal self-supported UNSTRETCHED mode as suggested in FIG. 1 and a relatively longer second distance when extensible carry handle 100 assumes the temporary STRETCHED mode as suggested in FIG. 2.

An extensible carry handle 100 in accordance with the present disclosure as the ability to carry infant excursion seat 10 hands free for an extended period of time. Portions 111, 121 of extensible carry handle 100 are semi-rigid to block carry handle 100 from becoming tangled and to make it easier for the caregiver to lift the carry handle 100 over their head while putting it on or taking it off. Each end of carry handle 100 has a sturdy decoupling mechanism 101, 102 for allowing removal of carry handle 100 from infant excursion seat 10 for times when it is not needed.

Adjustable-length strap section 130 includes an elongated flexible web 130W having a proximal end 130P coupled to elastic bungee section 140, a distal end 130D, and a mid-section 130M arranged to interconnect the proximal and distal ends 130P, 130D as shown in FIG. 4. Mid-section 130M is coupled to foot-end anchor mount 101M to partition mid-section 103M of web 100W into a first web segment 103M1 coupled to elastic bungee section 140 and a second web segment 103M2 arranged to extend along a portion of first web segment 103M1 toward elastic bungee section 140.

Adjustable-length strap section 103 further includes web-length adjuster means 103A that can be operated by a caregiver to change the effective length of adjustable-length strap section 130. Web-length adjuster 103A is coupled to distal end 103D of second web segment 103M2 of elongated web 103W to provide means for selectively sliding along mid-section 103M of elongated web 103W (1) in a first direction to move distal end 130D of elongated web 103W and second web segment 103M2 of mid-section 130M toward elastic bungee section 140 to shorten an effective length of variable-length anchor-connector strip 103 between foot-end and head-end anchors 101, 102 of extensible carry handle 100 and (2) in an opposite second direction to move distal end 130D of elongated web 103W and second web segment 103M2 of mid-section 130M away from elastic bungee section 140 to length the effective length of variable-length anchor-connector strip 103.

Strap support 110 further includes a foot-end anchor coupling 113 mounted on a proximal end of the semi-rigid bendable strap-support beam 111 to lie in spaced-apart relation to first strip receiver 112 as shown in FIG. 4. Foot-end anchor coupling 113 is configured to be coupled to foot-end anchor 101 as suggested in FIGS. 4 and 5.

Foot-end anchor 101 includes a foundation 101F comprising a rearwardly extending plate 101P and a strip-mount rod 101R associated with the rearwardly extending plate 101P as suggested in FIG. 4. Foot-end anchor coupling 113 of strap support 110 is connected to the rearwardly extending plate 101P to tether strap support 110 to foot-end anchor 101. Mid-section 130M of elongated web 130W is wrapped around strip-mount rod 101R to allow movement of mid-section 130M of elongated web 103W relative to strip-mount rod 101R of foundation 101F during a change in the effective length of variable-length anchor-connector strip 103. Foot-end anchor 101 also includes a top shell 1015 covering foundation 101F as suggested in FIG. 4.

Head-end anchor 102 is similar to foot-end anchor 101 as shown in FIG. 4 and includes a foundation 102F comprising a rearwardly extending plate 102P and a strip-mount rod 102R. Head-end anchor 102 also includes a top shell 102S covering foundation 102F.

Seating bucket 12 of infant excursion seat 10 includes a first side wall 22 and a second side wall 24 arranged to lie in spaced-apart relation to first side wall 22 to locate interior child-carrying space 16 therebetween as suggested in FIGS. 9 and 11. Foot-end anchor 101 of extensible carry handle 100 is mounted on first anchor post 18P of infant excursion seat 10 for rotation about a first axis of rotation 100A1 and head-end anchor 102 of extensible carry handle 100 is mounted on second anchor post 20P of infant excursion seat 10 for rotation about a second axis of rotation 100A2 to support variable-length anchor-connector strip 103 of extensible carry handle 100 for rotational movement from an UPRIGHT USE position in which variable-length anchor-connector strip 103 is self-supported and arranged to overlie interior child-carrying space 16 formed in seating bucket 12 in one of a first rotational direction to a self-supported FIRST ROTATED STORAGE position in which second side wall 24 of seating bucket 12 and variable-length anchor-connector strip 103 are arranged to lie in spaced-apart relation to one another to locate first side wall 22 of seating bucket therebetween as shown in FIG. 9 and on opposite second rotational direction to a self-supported SECOND ROTATED STORAGE position in which first side wall 22 of seating bucket 12 and variable-length anchor-connector strip 103 are arranged to lie in spaced-apart location to one another to locate second side wall 24 of seating bucket 12 therebetween as shown in FIG. 11.

Semi-rigid bendable strap-support and bungee-support beams 111, 121 are flexed to assume an outwardly bowed curved shape when foot-end anchor 101 of extensible carry handle 100 is mated with foot-end anchor 18P of infant excursion seat 10 and head-end anchor 102 of extensible carry handle 100 is mated with head-end anchor 20P of infant excursion seat 10 to support extensible carry handle 100 in an upwardly bowed U-shaped position self-supported and suspended above interior child-carrying space 16 formed in seating bucket 12 of infant excursion seat 10 as shown in FIG. 1. The semi-rigid bendable strap-support and bungee-support beams 111, 121 cooperate to form spacer means for holding pliable segment 103PS of variable-length anchor-connector strip 103 in a FIRST STATIONARY position in laterally outwardly spaced-apart self-supported relation to first side wall 22 of seating bucket 12 when variable-length anchor-connector strip 103 occupies the self-supported FIRST ROTATED STORAGE position as shown in FIG. 9 and in a SECOND STATIONARY position in laterally outwardly spaced-apart self-supported relation to second side wall 24 of seating bucket 12 when variable-length anchor-connector strip 103 occupies the self-supported SECOND ROTATED STORAGE position as shown in FIG. 11.

The invention claimed is:
1. A child restraint comprising:
an infant excursion seat including a seating bucket formed to include an interior child-carrying space, a first anchor post coupled to a foot end of the seating bucket and arranged to extend away from the interior child-carrying space, and a second anchor post coupled to an opposite head end of the seating bucket and arranged to extend away from the first anchor post and the interior child-carrying space, and
an extensible carry handle including a foot-end anchor adapted to be mated with the first anchor post, a strap support formed to include a semi-rigid bendable strap-support beam cantilevered to the foot-end anchor to extend toward the head-end anchor and a first strip receiver coupled to a free end of the semi-rigid bendable strap-support beam, a head-end anchor adapted to be mated with the second anchor post, a bungee support including a semi-rigid bendable bungee-support beam cantilevered to the head-end anchor to extend toward the strap support and a second strip receiver coupled to a free end of the semi-rigid bendable bungee-support beam, and a variable-length anchor-connector strip including a head-end anchor mount coupled to the head-end anchor, a foot-end anchor mount coupled to the foot-end anchor, and a pliable segment arranged to interconnect the head-end and foot-end anchor mounts and lie above the semi-rigid bendable strap-support and bungee-support beams and pass through the first and second strip receivers to allow movement of the variable-length anchor-connector strip relative to each of the strap and bungee supports, wherein the pliable segment of the variable-length anchor-connector strip includes an elastic bungee section coupled to the head-end anchor mount and arranged to overlie and engage an upwardly facing surface of the semi-rigid bendable bungee-support beam, and an adjustable-length strap section arranged to interconnect the elastic bungee section and the foot-end anchor mount and to overlie and engage an upwardly facing surface of the semi-rigid bendable strap-support beam.

2. The child restraint of claim 1, further comprising a shoulder pad that is adapted to engage a shoulder of a caregiver during shoulder transport of the infant excursion seat by the caregiver wherein the shoulder pad is coupled to the pliable segment of the variable-length connector strip and arranged to lie in a position on the pliable segment between the first strip receiver of the strap support and the second strip receiver of the bungee support.

3. The child restraint of claim 2, wherein the shoulder pad includes an elongated base arranged to underlie the pliable segment of the variable-length anchor-connector strip and a cover mounted on the elongated base to form a segment-receiving tunnel, the cover is arranged to lie between the first and second strip receivers, and the pliable segment is arranged to extend though the segment-receiving tunnel formed in the shoulder pad to support the shoulder pad on the variable-length anchor-connector strip.

4. The child restraint of claim 3, wherein the shoulder pad is formed to include a head-end inlet opening into the segment-receiving tunnel and facing toward the second strip receiver, and a foot-end inlet opening into the segment-receiving tunnel and facing toward the first strip receiver, the elastic bungee section of the pliable segment extends into the segment-receiving tunnel formed in the shoulder pad through the head-end inlet, and the adjustable-length strap section of the pliable segment extends into the segment-receiving tunnel to mate with the elastic bungee section at a junction inside the segment-receiving tunnel.

5. The child restraint of claim 4, wherein each of the semi-rigid bendable bungee-support and strap-support beams lie outside of the segment-receiving tunnel formed in the shoulder pad.

6. The child restraint of claim 4, the elongated base of the shoulder pad includes a head end arranged to underlie the free end of the semi-rigid bendable bungee-support beam and separated from the second strip receiver to locate the free end of the semi-rigid bendable bungee-support beam between the head end and the second strip receiver, a foot end arranged to underlie the free end of the semi-rigid bendable strap-support and separated from first strip receiver to locate the free end of the semi-rigid bendable strap-support beam between foot end and first strip receiver, and a body arranged to interconnect head and foot ends and support a junction of elastic bungee section and beam and separated from the first strip receiver to locate the free end of the semi-rigid bendable strap-support beam between the foot end and the first strip receiver, and a body arranged to interconnect the head and foot ends and support the junction of the elastic bungee section and the adjustable-length strap section of the pliable segment of the variable-length anchor-connector strip when the junction is located in the segment-receiving tunnel.

7. The child restraint of claim 1, wherein the elastic bungee section is configured normally to assume a contracted shape having a first length to establish a normal unstretched mode of the extensible carry handle when the seating bucket of the infant excursion seat is at rest on an underlying surface and when the foot-end anchor of the extensible carry handle is mated with the first anchor post of the infant excursion seat and the head-end anchor of the extensible carry handle is mated with the second anchor post of the infant excursion seat and wherein the elastic bungee section is configured to deform elastically to assume an expanded shape having a relatively longer second length so as to establish a temporary stretched mode of the extensible carry handle when the seating bucket of the infant excursion seat is lifted upwardly away from the underlying surface and supported in a lifted position using the variable-length anchor-connector strip of the extensible carry handle.

8. The child restraint of claim 7, wherein the elastic bungee section includes a topside oriented to face away from the semi-rigid bendable bungee-support beam and the interior child-carrying space and an underside oriented to face toward the semi-rigid bendable bungee-support beam and wherein the semi-rigid bendable bungee-support beam is configured to bend to assume an outwardly bowed curved shape when the extensible carry handle assumes the temporary stretched mode to provide bungee-deformation means for temporarily deforming the elastic bungee section to impart a convex shape to the topside of the elastic bungee section and a concave shape to the underside of the elastic bungee section while the extensible carry handle remains in the temporary stretched mode.

9. The child restraint of claim 8, wherein the semi-rigid bendable strap-support beam is configured to bend to assume an outwardly bowed curved shape when the extensible carry handle assumes the temporary stretched mode to provide strap-deformation means for temporarily deforming the adjustable-length strap section to impart a concave shape to an underside of the adjustable-length strap section oriented to face toward the interior child-carrying space formed in the seating bucket of the infant excursion seat while the extensible carry handle remains in the temporary stretched mode.

10. The child restraint of claim 7, further comprising a shoulder pad that is adapted to engage a shoulder of a caregiver during shoulder transport of the infant excursion seat by the caregiver and is mounted on the pliable segment of the variable-length anchor-connector strip to cover a junction between the elastic bungee section and the adjustable-length strap section, and wherein the second strip receiver that is coupled to the free end of the semi-rigid bendable bungee-support beam and the shoulder pad are separated by a first distance when the extensible carry handle assumes the normal unstretched mode and a relatively longer second distance when the extensible carry handle assumes the temporary stretched mode.

11. The child restraint of claim 1, wherein the adjustable-length strap section includes an elongated web having a proximal end coupled to the elastic bungee section, a distal end, and a mid-section arranged to interconnect the proximal and distal ends and coupled to the foot-end anchor mount to partition the mid-section of the web into a first web segment coupled to the elastic bungee section and a second web segment arranged to extend along a portion of the first web segment toward the elastic bungee section, and the adjustable-length strap section further includes web-length adjuster means coupled to the distal end of the first web segment of the elongated web for selectively sliding along the mid-section of the elongated web in a first direction to move the distal end of the elongated web and the second web segment of the mid-section toward the elastic bungee section to shorten an effective length of the variable-length connector strip between the foot-end and head-end anchors of the extensible carry handle and in an opposite second direction to move the distal end of the elongated web and the second web segment of the mid-section away from the elastic bungee section to lengthen the effective length of the variable-length anchor-connector strip.

12. The child restraint of claim 11, wherein the strap support further includes a foot-end anchor coupling mounted on a proximal end of the semi-rigid bendable strap-support beam to lie in spaced-apart relation to the first strip receiver, wherein the foot-end anchor includes a foundation comprising a rearwardly extending plate and a strip-mount rod associated with the rearwardly extending plate, the foot-end anchor coupling of the strap support is connected to the rearwardly extending plate to tether the strap support to the foot-end anchor, and the mid-section of the elongated web is wrapped around the strip-mount rod to allow movement of the mid-section of the elongated web relative to the strip-mount rod of the foundation during a change in the effective length of the variable-length anchor-connector strip.

13. The child restraint of claim 1, wherein the seating bucket of the infant excursion seat includes a first side wall and a second side wall arranged to lie in spaced-apart relation to the first side wall to locate the interior child-carrying space therebetween, the foot-end anchor of the extensible carry handle is mounted on the first anchor post of the infant excursion seat for rotation about a first axis of rotation, and the head-end anchor of the extensible carry handle is mounted on the second anchor post of the infant excursion seat for rotation about a second axis of rotation to support the variable-length anchor-connector strip of the extensible carry handle for rotational movement from an upright use position in which the variable-length anchor-connector strip is arranged to overlie the interior child-carrying space formed in the seating bucket in one of a first rotational direction to a first rotated storage position in which the second side wall of the seating bucket and the variable-length anchor-connector strip are arranged to lie in spaced-apart relation to one another to locate the first side wall of the seating bucket therebetween and an opposite second rotational direction to a second rotated storage position in which the first side wall of the seating bucket and the variable-length anchor-connector strip are arranged to lie in spaced-apart location to one another to locate the second side wall of the seating bucket therebetween.

14. The child restraint of claim 13, the semi-rigid bendable strap-support and bungee-support beams are flexed to assume an outwardly bowed curved shape when the foot-end anchor of the extensible carry handle is mated with the foot-end anchor of the infant excursion seat and the head-end anchor of the extensible carry handle is mated with the head-end anchor of the infant excursion seat to support the extensible carry handle in an upwardly bowed U-shaped position suspended above the interior child-carrying space formed in the seating bucket of the infant excursion seat and the semi-rigid bendable strap-support and bungee-support beams cooperate to form spacer means for holding the pliable segment of the variable-length anchor-connector strip in a first stationary position in laterally outwardly spaced-apart relation to the first side wall of the seating bucket when the variable-length anchor-connector strip occupies the first rotated storage position and in a second stationary position in laterally outwardly spaced-apart relation to the second side wall of the seating bucket when the variable-length anchor-connector strip occupies the second rotated storage position.

15. A child restraint comprising:
an infant excursion seat including a seating bucket formed to include an interior child-carrying space, a first anchor post coupled to a first end of the seating bucket and arranged to extend away from the interior child-carrying space, and a second anchor post coupled to an opposite second end of the seating bucket and arranged to extend away from the first anchor post and the interior child-carrying space, and
an extensible carry handle including a first-end anchor adapted to be mated with the first anchor post, a strap support formed to include a semi-rigid bendable strap-support beam cantilevered to the first-end anchor to extend toward the second-end anchor and a first strip receiver coupled to a free end of the semi-rigid bendable strap-support beam, a second-end anchor adapted to be mated with the second anchor post, a bungee support including a semi-rigid bendable bungee-support beam cantilevered to the second-end anchor to extend toward the strap support and a second strip receiver coupled to a free end of the semi-rigid bendable bungee-support beam, and a variable-length anchor-connector strip including a second-end anchor mount coupled to the second-end anchor, a first-end anchor mount coupled to the first-end anchor, and a pliable segment arranged to interconnect the second-end and first-end anchor mounts and lie above the semi-rigid bendable strap-support and bungee-support beams and pass through the first and second strip receivers to allow movement of the variable-length anchor-connector strip relative to each of the strap and bungee supports,
wherein the pliable segment of the variable-length anchor-connector strip includes an elastic bungee section coupled to the second-end anchor mount and arranged to overlie and engage an upwardly facing surface of the semi-rigid bendable bungee-support beam, and an adjustable-length strap section arranged to interconnect the elastic bungee section and the first-end anchor mount and to overlie and engage an upwardly facing surface of the semi-rigid bendable strap-support beam.

16. The child restraint of claim 15, further comprising a shoulder pad that is adapted to engage a shoulder of a caregiver during shoulder transport of the infant excursion seat by the caregiver wherein the shoulder pad is coupled to the pliable segment of the variable-length connector strip and arranged to lie in a position on the pliable segment between the first strip receiver of the strap support and the second strip receiver of the bungee support.

17. The child restraint of claim 15, wherein the elastic bungee section is configured normally to assume a contracted shape having a first length to establish a normal unstretched mode of the extensible carry handle when the seating bucket of the infant excursion seat is at rest on an underlying surface and when the first-end anchor of the extensible carry handle is mated with the first anchor post of the infant excursion seat and the second-end anchor of the extensible carry handle is mated with the second anchor post of the infant excursion seat and wherein the elastic bungee section is configured to deform elastically to assume an expanded shape having a relatively longer second length so as to establish a temporary stretched mode of the extensible carry handle when the seating bucket of the infant excursion seat is lifted upwardly away from the underlying surface and supported in a lifted position using the variable-length anchor-connector strip of the extensible carry handle.

18. The child restraint of claim 17, wherein the elastic bungee section includes a topside oriented to face away from the semi-rigid bendable bungee-support beam and the interior child-carrying space and an underside oriented to face toward the semi-rigid bendable bungee-support beam and wherein the semi-rigid bendable bungee-support beam is configured to bend to assume an outwardly bowed curved shape when the extensible carry handle assumes the temporary stretched mode to provide bungee-deformation means for temporarily deforming the elastic bungee section to impart a convex shape to the topside of the elastic bungee section and a concave shape to the underside of the elastic bungee section while the extensible carry handle remains in the temporary stretched mode.

19. The child restraint of claim 15, wherein the seating bucket of the infant excursion seat includes a first side wall and a second side wall arranged to lie in spaced-apart relation to the first side wall to locate the interior child-carrying space therebetween, the first-end anchor of the extensible carry handle is mounted on the first anchor post of the infant excursion seat for rotation about a first axis of rotation, and the second-end anchor of the extensible carry handle is mounted on the second anchor post of the infant excursion seat for rotation about a second axis of rotation to support the variable-length anchor-connector strip of the extensible carry handle for rotational movement from an upright use position in which the variable-length anchor-connector strip is arranged to overlie the interior child-carrying space formed in the seating bucket in one of a first rotational direction to a first rotated storage position in which the second side wall of the seating bucket and the variable-length anchor-connector strip are arranged to lie in spaced-apart relation to one another to locate the first side wall of the seating bucket therebetween and an opposite second rotational direction to a second rotated storage position in which the first side wall of the seating bucket and the variable-length anchor-connector strip are arranged to lie in spaced-apart location to one another to locate the second side wall of the seating bucket therebetween.

20. The child restraint of claim 19, the semi-rigid bendable strap-support and bungee-support beams are flexed to assume an outwardly bowed curved shape when the first-end anchor of the extensible carry handle is mated with the first-end anchor of the infant excursion seat and the second-end anchor of the extensible carry handle is mated with the second-end anchor of the infant excursion seat to support the extensible carry handle in an upwardly bowed U-shaped position suspended above the interior child-carrying space formed in the seating bucket of the infant excursion seat and the semi-rigid bendable strap-support and bungee-support beams cooperate to form spacer means for holding the pliable segment of the variable-length anchor-connector strip in a first stationary position in laterally outwardly spaced-apart relation to the first side wall of the seating bucket when the variable-length anchor-connector strip occupies the first rotated storage position and in a second stationary position in laterally outwardly spaced-apart relation to the second side wall of the seating bucket when the variable-length anchor-connector strip occupies the second rotated storage position.

\* \* \* \* \*